INVENTORS
WOLDIMAR SOBOL
HORATIO LESLIE HIGGINS
BY
Ralph W. McIntire, Jr.
ATTORNEY 3,401,775
SLACK ADJUSTER
Woldimar Sobol and Horatio Leslie Higgins, London, England, assignors to Westinghouse Brake & Signal Company, Ltd., London, England
Original application Jan. 21, 1965, Ser. No. 426,807, now Patent No. 3,338,356, dated Aug. 29, 1967. Divided and this application May 29, 1967, Ser. No. 642,063
Claims priority, application Great Britain, Jan. 31, 1964, 4,195/64, 4,196/64, 4,197/64
10 Claims. (Cl. 188—196)

ABSTRACT OF THE DISCLOSURE

A slack adjuster of the double acting type in which a sensing member on one of a pair of telescoping members normally clutches a pair of nuts on a second of the pair of telescoping members to hold the telescoping members in predetermined telescoped position for no-slack operation. To take up slack, the sensing member engages a stop, thereby declutching one nut to provide movement of the one nut along the second member to extend the second member relative to the first member during brake application, and on brake release clutches the first nut and declutches the second nut to provide corresponding movement of the second nut on the second member. To let out slack, the sensing means, which is normally clutched to the second member during no-slack operation and also during slack take-up operation, is declutched to provide rotation of the sensing means and the pair of nuts as a unit relative to the second member to provide retraction of the telescoping members.

---

This is a division of application Ser. No. 426,807, filed Jan. 21, 1965, now U.S. Patent No. 3,338,356 by Woldimar Sobol and Horatio Leslie Higgins.

The present invention comprises an automatic double-acting slack adjuster having first and second members movable telescopically relative one to the other to effect slack adjustment, the first member having a threaded portion threadedly engaged by first and second nuts, displacement of which on the screw-threaded portion effects relative telescoping of the two members, a sensing member resiliently axially located with respect to a flange slidably received on the second member and non-rotatably mounted relative to the flange for movement with the second member into engagement with a stop, a first spring resiliently holding the first nut clutched relative to the sensing member and a second spring extending between the sensing member and the second nut and resiliently holding the second nut clutched to the flange, the arrangement being such that a force applied to the first member in the brake-applying direction tends to break the clutches against the resilient force exerted thereon by the springs and a force applied to the first member in the opposite direction tends to reinforce the clutching of the nuts to the sensing member and second member, respectively. By the term "brake-applying" direction it is to be understood that such direction is that direction in which, when the slack adjuster is incorporated in a brake system, in operation of that system, the first member moves during the application of the brakes.

To provide for slack adjustment in the slack increasing direction, the flange is clutched to the second member by a third spring compressible only upon the application thereto of a force, the magnitude and direction of that which is transmitted, in operation of the slack adjuster, through the slack adjuster during actual braking (that is to say, when braking force is actually being applied), the flange being rotatably supported relative to the second member when the flange is declutched from the second member by compression of the third spring. By such an arrangement, compression of the third spring before the sensing member engages the stop permits axial displacement by spinning of the two nuts on the first member relatively to adjust the axial relationship of the members by axial movement of one of the members only for as long as the sensing member does not engage the stop. Preferably, the sensing member is non-rotatably coupled to the element conveniently by a pin-and-slot arrangement. Hence, it will be seen that normally (and in the release condition of the slack adjuster) the sensing member will be non-rotatably mounted relatively to the second member being released for rotation relative thereto only upon compression of the third spring and consequent declutching of the flange from the second member. The rotatable support of the flange may be provided by a thrust bearing which may be located either between the third spring and the element or between the third spring and the second member.

The sensing member may be axially located on the second member by being held into engagement with an abutment (which may be annular) located relative to the second member by a second spring.

When the slack adjuster is incorporated with a brake cylinder, the first and second members constitute the piston rod of the brake cylinder, the second member being connected to the piston of the brake cylinder. The stop in this arrangement may conveniently be carried by the cylinder of the brake cylinder.

The present invention may be applied in respect of slack adjusters incorporated with brake cylinders, whether the brake cylinders be of the type for rigidly securing to its mounting or whether it be of the type for being trunnioned to its mounting.

For slack adjusters incorporated with brake cylinders of the former type, the second member is pivotally connected to the piston of the brake cylinder. In slack adjusters for incorporation with brake cylinders of the latter type, the second member may be rigidly secured to the piston of the brake cylinder.

In slack adjusters in which the second member is pivotally secured to the piston of the brake cylinder, the piston may be provided with a hollow trunk surrounding the second member, the trunk being slidable within the cylinder of the brake cylinder and provided at its outer end remote from the piston with means for connection thereto of a hand brake. In this arrangement, the stop may comprise a ring secured to the cylinder of the brake cylinder through the trunk. In this case, one side of the ring may constitute the stop which is engageable with an annular member carried by the sensing member and the other side of which constitutes an abutment engageable by a stop-ring engagement of which with the abutment constitutes the piston stop for the piston of the brake cylinder.

In slack adjusters incorporated in brake cylinders having trunnions by which the brake cylinder can be secured to its mounting, the stop of the slack adjuster may be carried by one end of a tubular extension the other end of which is secured to the cylinder of the brake cylinder and within which the sensing member is axially movable.

Embodiments of the present invention will now be described in greater detail, by way of example only, with reference to the accompanying drawing, in which.

Figure 1:
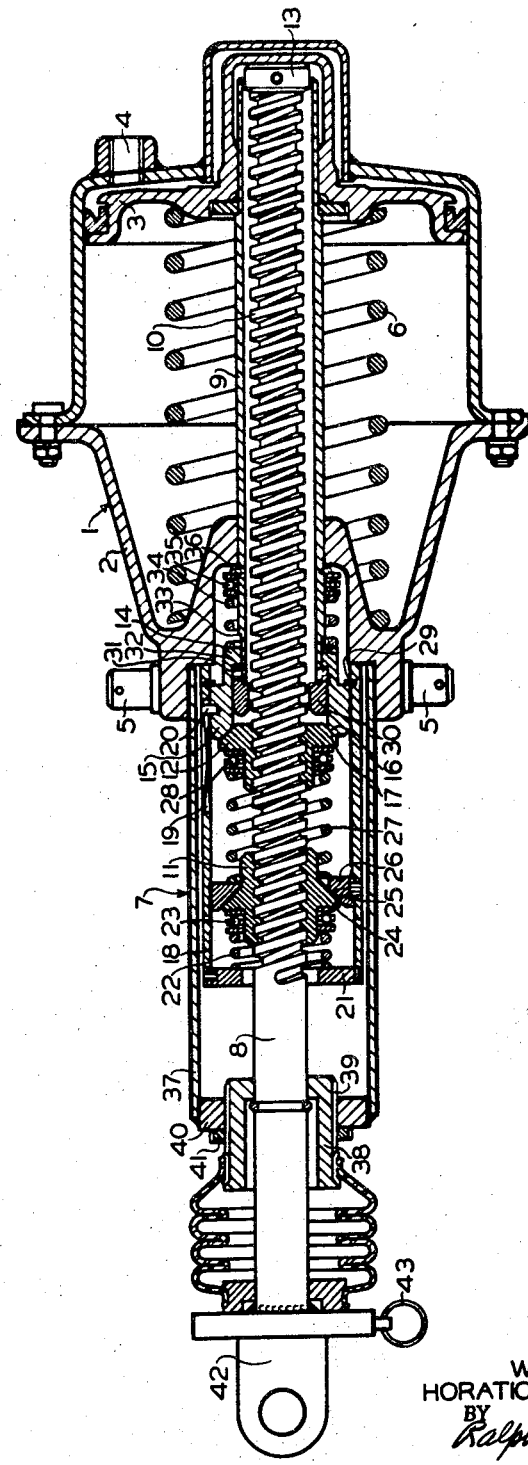
FIG. 1 is a cross-secitonal view of the double-acting slack adjuster of the present invention shown incorporated in a trunnion mounted brake cylinder.

Referring now to FIG. 1, there is provided a brake cylinder 1 comprising a cylinder 2 within which is axially slidable a piston 3. The cylinder 2 is provided, in the usual manner, with an inlet 4 and a pair of trunnions 5 by which the brake cylinder can be secured to its mounting to permit the brake cylinder to pivot on its mounting during the application of the brakes (not shown). In the usual manner, the cylinder 2 houses a return spring 6 for the piston 3.

Incorporated with the brake cylinder 1 is the slack adjuster 7. This slack adjuster comprises a first member 8 and a second member 9 movable telescopically relative one to the other. The first member 8 (which is constituted by a spindle) has a threaded portion 10 threadedly engaged with which are first and second nuts 11 and 12, respectively.

The second member 9, comprising a tube into which the threaded portion 10 of the spindle 8 projects and is guided by a bearing 13, is rigidly secured by one end to the piston 3. Slidably and rotatably disposed on the opposite end of the tube 9 is a flange element 14 having an axially projecting extension 15 which provides a clutch face 16 engaged by a clutch face 17 on the nut 12.

Surrounding the two nuts 11 and 12 is a tubular sensing member 18 provided with a linear slot 19 in which is slidable a pin 20 projecting radially outwardly from the flange 15. The sensing member 18 is provided at its left-hand end with an annular end plate 21 abutted by one end of a spring 22 the other end of which abuts a thrust bearing 23 interposed between the spring 22 and the nut 11, so that the spring 22 resiliently urges into engagement a clutch face 24 on the nut 11 and a clutch face 25 on an annulus 26 secured to the sensing member 18. The side of the annulus 26 remote from the clutch face 24 is abutted by one end of a spring 27 the other end of which abuts a thrust bearing 28 interposed between the spring 27 and the nut 12. This spring 27 is effetcive resiliently to hold the clutch faces 16 and 17 engaged and to urge the sensing member 18 to the left into a position in which a snap ring 29 towards the right-hand end of the sensing member 18 abuts the flange 15 disposed on the tube 9. It will be seen, therefore, that the spring 27 is effective resiliently axially to locate the sensing member 18 on the second member, that is, tube 9, and, further it will be seen that the sensing member 18 is non-rotatably mounted on the flange extension 15 by virtue of the pin-and-slot arrangement 19/20.

In order to provide for a slack increasing operation of the double-acting slack adjuster, the aforementioned flange 14 is disposed on the end of tube 9 for axial movement between first and second limits. The first limit is defined by annular member 30 fixedly disposed on the end of tube 9 concentrically within flange extension 15 and having on one end thereof a clutch face 31 engageable with a clutch face 32 on one end of flange 14. The second limit is defined by a shoulder 33 on tube 9 engageable with the other end of flange 14. A strong spring 34 is disposed between the end of flange 14 and a thrust bearing 35 axially seated on a snap ring 36 secured to tube 9.

The spring 34 is a very heavy spring which is compressible only by a force of the magnitude of that which is transmitted through the slack adjuster when braking effort is actually being applied. However, axial movement of the flange 14 under even these conditions is limited by the shoulder 33 on tube 9.

The cylinder 2 of the brake cylinder 1 is provided with a tubular extension 37 which is secured by its right-hand end to the cylinder 2 and carries, on its left-hand end, a stop 38. This stop 38 is provided on its external surface with a screw thread 39 which mates with a cooperating screw thread on an end plate 40 closing the end of the tubular extension 37. The stop 38 is therefore axially adjustable with relation to the tubular extension 37 and can be locked in any desired position by a lock nut 41.

At its outward extremity, the spindle 8 is provided with a crosshead 42. This crosshead 42 is releasably non-rotatably coupled to the spindle 8 by a latch (not shown) which is releasable by a pull-ring 43, to permit relative rotation of the crosshead 42 and the spindle 8.

In now describing the operation of the double-acting slack adjuster of FIG. 1, in the slack decreasing direction, let it be firstly assumed that the clearance between the brake blocks and the wheel of a conventional brake rigging is normal. Upon the application of air pressure to the piston 3 through the inlet 4, the piston 3 will be moved to the left against its return spring 6. In so moving to the left, it will carry with it the tube 9 which is fixed to the piston 3 and movement of the tube 9 will be transmitted to the spindle 8 through snap ring 36, thrust bearing 35 and spring 34, the flange 15, the clutch faces 16/17 (which prevent the nut 12 from spinning), and the nut 12. Flange 14 is prevented from spinning by engagement of clutch faces 31 and 32. During this movement, the sensing member 18 will be carried along with the tube 9 and the spindle 8 by virtue of the spring 27 acting through the annulus 26 onto the sensing member 18 to hold its snap ring 29 in engagement with the flange extension 15. Insofar as the sensing member 18 is caused to move to the left, the nut 11 and spring 22 will, of course, also be moved to the left. Now, as the initial distance between the stop 38 and the end plate 21 of the sensing member 18 corresponded to the normal clearance of the brake blocks and wheel, such movement of the various parts, as above described, will continue until the brake blocks engage the wheel. However, upon such engagement, the end plate 21 will also engage the stop 38. After the brake blocks engage the wheel, the spindle 8 will thereby be prevented from further movement to the left as thereby will the nut 12 and the flange extension 15. However, the tube 9 can still move to the left by a restricted amount as the pressure built up will be sufficient to overcome the resistance of the heavy spring 41 which will be compressed, but, shortly, the tube 9 will be arrested as the shoulder 33 thereon engages the end of the flange 15. After such engagement, full braking effort can now be applied to the brake blocks by the increase of pressure in the cylinder 2 through the piston 3, the tube 9, shoulder 33, flange extension 15, clutch faces 16/17, nut 12, spindle 8, and crosshead 42.

Upon release of the brakes by reduction of the air pressure in the cylinder 2, the piston 3 is returned to the right by its return spring 6, the spring 41 recovers its pre-loaded condition to re-engage the clutch faces 31/32 and, thereafter, the snap-ring 29 having been maintained engaged with the flange extension 15, the sensing member 18, springs 22 and 27, and nuts 11 and 12 will be returned to the right with the tube 9. Likewise, the return of the sensing member 18 to the right will return with it the spindle 8, thus retracting the brake blocks from the wheel.

Let it now be assumed that, due to wear of the brake blocks or any other means, the clearance between the brake blocks and the wheels is greater than normal. In this event, the initial stage of operation of the brake cylinder and slack adjuster will be as above described but a stage will be reached at which the end plate 21 of the sensing member 18 will engage the stop 38 whereas, due to the excessive clearance, the brake blocks will not yet have engaged the wheel. Subsequent to this and prior to the brake blocks engaging the wheel, the brake blocks will be continued to be moved by the piston 3 by the movement of the piston 3 being transmitted to the brake blocks through the tube 9, snap ring 36, thrust bearing 35, spring 34, clutch faces 31, 32, flange 14, flange extension 15, clutch faces 16/17, nut 12, spindle 8 and crosshead 42. Such continued movement of the spindle 8 is permitted because by the movement of the spindle 8, the nut 11 will tend to be moved with the spindle 8 to the left thus compressing the spring 22. Such compression of the spring 22 releases the clutch faces 24/25 from engagement and the nut 11, being supported on the thrust bearing 23, will be free to spin as the spindle 8 is passed through the nut 11. During this movement subsequent to the engagement of the plate 21 of the sensing member 18 with the stop 38, it will be seen that the nut 12 will be moved closer towards the nut 11 thereby compressing the spring 27 and separating flange extension 15 from snap ring 29.

This movement continues until the brake blocks engage the wheel whereafter further movement of spindle 8 is prevented and spring 34 will be compressed by continued movement of tube 9 until shoulder 33 abuts flange 14. Thereafter, full braking effort can be applied to the blocks through tube 9, shoulder 33, flange 14, nut 12 and spindle 8.

When the clearance was normal, it will be remembered that upon subsequent release of the brakes, the spindle 8 was immediately returned to the right with the return of the piston 3. This return of the spindle 8 was secured because the snap ring 29 was still in engagement with the flange extension 15. However, in this instance of excessive clearance, not only will the nut 12 have been moved closer to the nut 11 but, by a like distance, the flange 15 will have been separated from the snap ring 29. Consequently, during the initial stage of release, as the tube 9 moves back to the right under the influence of the piston return spring 6, the snap ring 29 is not immediately engaged to return the sensing member 18 with the tube 9. Indeed, any tendency of the sensing member 18 to return to the right is prevented by the previous compression of the spring 27 which now serves resiliently to retain the end plate 21 of the sensing member 18 in engagement with the stop 38. Insofar as the sensing member 18 is, therefore, restrained from movement to the right with the return of the tube 9, the spindle 8 will be likewise restrained as any tendency of the spindle 8 to move to the right only more firmly retains the clutch faces 24/25 engaged and, therefore, more positively prevents the nut 11 from spinning. If, therefore, this nut 11 cannot spin, the spindle 8 cannot move to the right. It will be seen, therefore, that while the tube 9 is returning to the right in this initial stage, the spindle 8, the nut 11, and the sensing member 18 will all be retained in a position corresponding to the abutment of the end plate 21 of the sensing member 18 with stop 38. However, as the tube 9 returns to the right, it will tend to separate the clutch faces 16/17 between the flange 15 and the nut 12. This easing of the contact between the two clutch faces 16/17 frees the nut 12 or spinning, and the nut 12 will consequently spin (under the influence of the compressed spring 27 and supported on its thrust bearing 28) along the spindle 8 "chasing" the flange extension 15. Such movement will continue until the flange extension 15 once more re-engages the snap ring 29 on the sensing member 18. That is, until the spacing between the nuts 11 and 12 is once more restored to normal.

A condition now prevails in which the brake blocks are still in contact with the wheels, the end plate 21 of the sensing member 18 still engages the stop 38, and the relative positions of the nuts 11 and 12 and the sensing member 18 are restored to their normal position. It will be noticed that this condition is characteristic of the position immediately on release when the clearance between the brake blocks and the wheels has been normal. Consequently, further release of the brake occurs in a manner identical to that of release of the brakes after an application in which the clearance between the brake blocks and the wheels was normal. That is to say, as the piston 3 continues to return to the right under the influence of its return spring 6, all the parts within the sensing member 18 and the spindle 8 will preserve their relative positions and the brake blocks will be removed from contact from the wheels.

By the provision of the latch means (not shown) above mentioned, manual resetting of the clearance in a brake reblocking operation can be achieved. By pulling on the pull-ring 43, a latch (not shown) is released so that the rod 8 is free to be rotated relative to the crosshead 42. By rotation of the rod 8 (which may be facilitated by the provision of a handwheel secured to the pull-rod 8), the rod 8 can be wound into and out of the tube 9 thus increasing or decreasing, respectively, the brake block clearance. In a re-blocking operation, the rod 8 is rotated sufficient to withdraw the brake blocks from the wheel a distance great enough to allow the worn blocks to be removed and the new blocks to be inserted in their place.

In now describing the operation of the double-acting slack adjuster in the slack increasing direction, let it now be assumed that the clearance between the blocks and the wheel is now inadequate, that is to say, that the clearance between the blocks and the wheel is less than normal. In this event, the initial stage of the application of the brakes is as for normal clearance, but a condition will be arrived at at which the blocks have engaged the wheel but the end plate 21 of the sensing member 18 has not yet reached the stop 38. Continued increase of pressure in the cylinder 2 will increase the force being exerted on spring 34 through the tube 9, the snap ring 36 and the thrust bearing 35. As the pressure continues to increase, the stage will be reached at which the spring 34 will be collapsed, thus freeing the clutch faces 31, 32. When this occurs, the sensing member 18, together with the two nuts 11 and 12, are freed for rotation, these parts then being supported on the thrust bearing 35. As the spindle 8 cannot move due to the engagement of the blocks with the wheel, the sensing member 18 and the two nuts 11 and 12 can only spin if they are free to move to the left under the influence of the compressed spring 34. In normal clearance, this they are not free to do, but, in this instance, as the plate 21 is not yet engaged, the stop 38, the sensing member 18 and the nuts 11 and 12 are, in fact, free to spin to the left down the spindle 8. Such spinning will, therefore, occur as the flange extension 15 "chases" the end member 30 on the tube 9 to the left. Consequently, the tube 9 will telescope over the spindle 8 until the sensing member 18 is prevented from further movement to the left by the engagement of the end plate 21 of the sensing member 18 with the stop 38. When such engagement occurs, the sensing member 18 being prevented from any further movement to the left, continued movement of the tube 9 will cause the shoulder 33 to catch up with the flange extension 15 and to bring it into engagement therewith. This condition is then characteristic of normal clearance immediately before the buildup of braking force. Consequently, the further operations of the slack adjuster are identical to the operation of the slack adjuster in the event of correct clearance between the brake blocks and the wheel.

As above described, means for manually resetting the slack adjuster in re-blocking of the brakes is provided, namely, the latch controlled by the pull-ring 43, the operation of which frees the rod 8 for rotation relative to the crosshead 42 and permits the rod 8 to be manually rotated (by means of a handwheel when provided) to adjust the clearance between the brake blocks and the wheel. However, such facility may not be necessary in a construction involving a double-acting slack adjuster as, for reblocking the insertion of a wedge between the blocks and the wheel and the subsequent application and release of the brakes, will open up the clearance between the blocks and the wheel (the slack adjuster, due to the presence of the wedge, operating as if inadequate clearance existed).

If the gap between the blocks and the wheels is still not sufficient to accommodate new blocks, this operation can be repeated until the gap is sufficient. After re-blocking, no matter what the state of the clearance may be, it will be reset upon a subsequent application and release of the brakes due to the slack adjuster being double-acting.

In the arrangement above described, the brake cylinder is provided with trunnions 5 by means of which the cylinder is pivotally secured on its mounting. However, such a construction is open to certain objections and, in some instances, it is preferable that the cylinder should be rigidly secured to its mounting, although this does produce complications, as it is necessary for the free end of the piston rod to be free to move up and down relative to the mounting to accommodate rise and fall of the crosshead during the application and release of the brakes and to move sideways to accommodate rigging float and wear.

There will now be described, with reference to FIG. 2, the double-acting slack adjuster of FIG. 1 modified for use with a fixed cylinder, with those parts common to FIGS. 1 and 2 having the same reference numerals.

Figure 2:
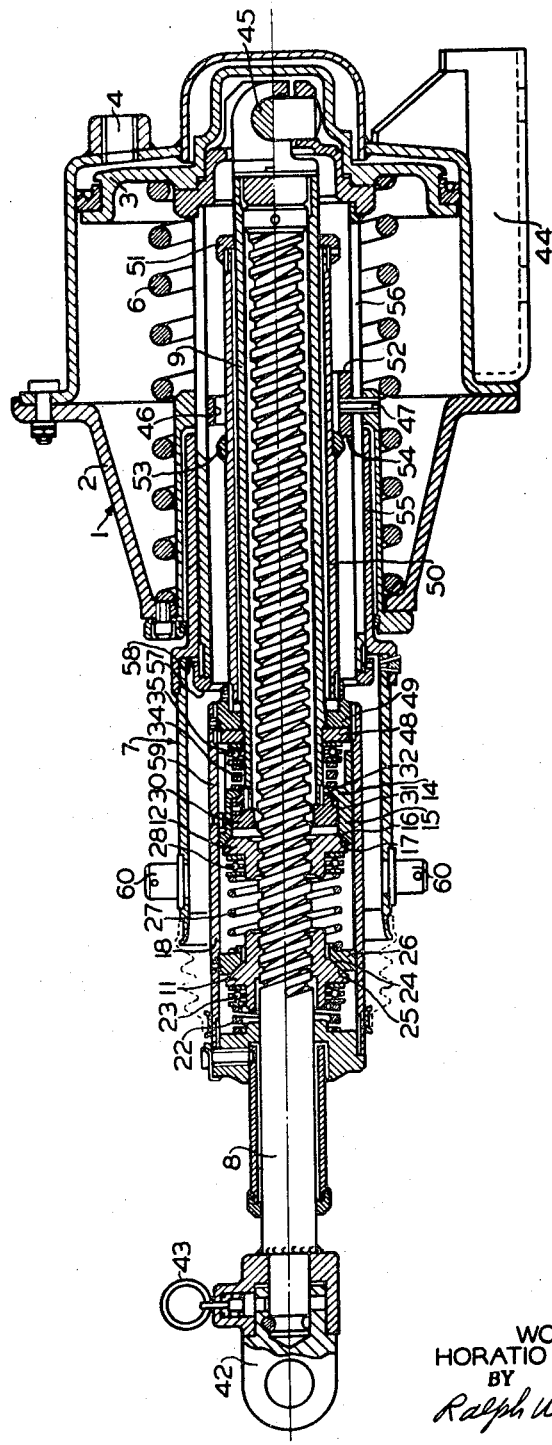
FIG. 2 is a cross-sectional view of another embodiment of the double-acting slack adjuster of the present invention shown incorporated in a fixedly mounted brake cylinder.

Referring now to FIG. 2, there is illustrated a brake cylinder 1 with which is incorporated a slack adjuster 7. The brake cylinder 1 comprises a cylinder 2 provided with a bracket 44 by which it may be rigidly secured to its mounting. As in the previous embodiments, the cylinder 2 is provided with a piston 3, an inlet 4 and a piston return spring 6.

The slack adjuster 7 again comprises a spindle 8 and a tube 9, but in this case the tube 9 is pivotally connected by a pin 45 to the piston 3. There is also the sensing member 18, the nuts 11 and 12 together with their associated springs and thrust bearings 22, 27, 23 and 28, respectively, the nut 11 again has a clutch face 25 engageable with a clutch face 24 on the annulus 26 secured to the sensing member 18, and the nut 12 has a clutch face 17 engaged with the corresponding face 16 on the flange extension 15 of flange 14 slidably disposed on the end of the tube 9.

Likewise, there is provided a stop 46 which, in this embodiment, is secured to a part of the cylinder 2 by means of a plurality of pins 47 (of which one only is shown).

In order to provide the slack adjuster with the facility for adjusting in respect of inadequate clearance, the slack adjuster is provided with means similar to that provided in the slack adjuster of FIG. 1. The flange extension 15 is again axially movable with respect to the tube 9 but is normally maintained axially located thereon by the heavy spring 34 which urges into engagement the clutch faces 31, 32 on the flange extension 15 and on an end ring 30 secured to the tube 9, respectively. There is again provided a member 48 corresponding to the snap ring of the embodiment of FIG. 1, between which and the heavy spring 34 there is located a thrust bearing 35. There is a minor difference between the construction of the present FIG. 2 and that of FIG. 1, in that the shoulder 48 with which the flange 15 is engageable is not carried direct by the tube 9 but is carried by the member 49 secured thereto.

In this embodiment the sensing member 18 is provided with a tubular extension 50 extending rearwardly the sensing member 18 towards the piston 3. The extension 50 is provided towards its right-hand end with a stop-ring 51 engageable with a stop face 52 on the ring 46. Also, on the other side of the ring 46 there is secured to the extension 50 a further ring 53 engageable with an abutment face 54 on the side of the ring 46 opposite to that of the stop face 52.

The automatic operation of the single-acting slack adjuster of FIG. 2 is essentially similar to the operation of the slack adjuster of FIG. 1. Let it first be assumed that the clearance is normal. Upon the introduction of air into the cylinder 2 through the inlet 4, the piston 3 will be caused to move to the left against its return spring 6, taking with it the tube 9. Again, movement of the tube 9 to the left carries the spindle 8 to the left through the medium of the flange 14, flange extension 15, clutch faces 16/17 and nut 12. As the brake clearance is normal, the blocks will engage the wheels at the instance that the ring 51 engages the stop face 52 of the ring 46. As the pressure in cylinder 2 commences to apply braking force, the spring 34 is collapsed by the force transmitted through the slack adjuster to cause engagement of flange 14 with member 48. Hence, when braking force is being applied, this force is transmitted to piston 3, pivot pin 45, tube 9, the members 49 and 48, flange 14, flange extension 15, nuts 12, spindle 8 and crosshead 42.

Release of the brakes will also be similar in that the ring 48 (corresponding to the snap ring 29 of the previously described embodiments) still being abutted by the flange extension 15 under the influence of the spring 27, the sensing member 18 will be returned to the right with the tube 9 under the influence of the piston return spring 6. This return movement of the sensing member 18 will be transmitted to the brake blocks through the springs 22 and 27, the nuts 11 and 12 (which are again prevented from rotation by the engagement of the clutch faces 24/25 and 16/17, respectively), spindle 8 and crosshead 42.

At the end of the return stroke of the piston 3, it will be noted that in this arrangement the final position of the piston 3 is determined by abutment of the rings 53 on the tube 9 with the abutment face 54 on the ring 46.

Let it now be assumed that the clearance between the blocks and the wheels is excessive. In this case, the initial stage of the application of the brakes will be as above described, but a condition will be reached at which, while the ring 51 is abutting the stop face 52, the blocks will not yet be in engagement with the wheel. Continued movement of the piston 3, therefore, continues the movement of the tube 9 which, through the nut 12, will continue the movement of the spindle 8 until the blocks engage the wheel. During this continued movement, the nut 11 will be caused to spin as the spindle 8 is moved in the brake-applying direction through the nut 11 to compress the spring 22 and ease the engagement of the clutch faces 24/25 to allow the nut 11 to spin. Again, such operation will cause the nut 12 to be moved closer to the nut 11 and for the flange extension 15 to be moved away from the ring 48, the amount of each of these movements being a measure of the amount of excess of clearance which existed before the application between the blocks and the wheel.

On release of the brakes during the initial stage of this release, the spindle 8 will be retained in a position in which the blocks are maintained engaged with the wheel by virtue of the compressed spring 27 maintaining the sensing member 18 in position with its ring 51 abutting the stop face 52, while the tube 9 is returned to the right under the influence of the piston return spring 6, and the nut 12 is caused to "chase" the flange extension 15 under the influence of the spring 27. This recovery continues until the flange 15 once more abuts the member 30, a condition characteristic of normal clearance of the brakes. Thereafter, continued return of the piston 3 will, through the tube 9, the sensing member 18, the spring 27 and the nut 12, return the slack adjuster 7 bodily to the right and, through the movement of the spindle 8, pull the blocks away from the wheel. Such return will, again, continue until the ring 53 engages the abutment face 54 on the ring 46.

In the event of inadequate clearance the operation is as follows:

During the initial stage of a brake application, as before, the blocks are moved towards the wheel upon the application of air pressure into the cylinder 2 by movement of the piston 3. This movement of the piston 3 is transmitted through the pin 45, the tube 9, the member 48, the thrust bearing 35, spring 34, flange extension 15 (which is prevented from rotation by the inter-engagement of the clutch faces 31, 32), nut 12 (which is prevented from rotation by inter-engagement of the clutch faces 16/17), spindle 8, and crosshead 42. However, by virtue of the inadequate clearance, the blocks will engage the wheel before the ring 51 engages the stop face 52. Such engagement of the blocks with the wheel arrests the spindle 8 and prevents further movement of it to the left. When the spindle 8 stops, the nut 12 also tends to stop so that the force transmitted through the slack adjuster causes compression of the spring 34. This compression of the spring 34 eases the clutch faces 31, 32 out of engagement so that the whole of the slack adjuster is now supported on the thrust bearing 35 and (as in the arrangement of FIG. 1) the slack adjuster spins to the left down the spindle 8 chasing the end ring 49 on the tube 9. Such movement continues until the ring 51 engages the stop face 52 whereupon further spinning movement of the slack adjuster is prevented and the member 48 is caused by further movement of the tube 9 to catch up with flange extension 15 and to permit the application of full braking effort in the normal manner. Again, this condition is characteristic of normal clearance and subsequent release of the brakes occurs in a manner identical to that as if the clearance had been normal in the first instance.

In the embodiment as shown in FIG. 2, there is also provided latch means for manual resetting of the slack adjuster similar to that described with reference to the FIG. 1 by which the crosshead 42 can be rotatably disconnected from the spindle 8 to permit the spindle 8 to be screwed in and out of the tube 9.

To provide for a hand brake operation of the embodiment of FIG. 2, there is provided, secured to the piston 3, a trunk 55 which surrounds the tube 9 and is provided with a slot 56 for each of the pins 73 securing the ring 31 to the cylinder 2. The trunk 55 is provided at its outward end remote from the piston 3 with an end stop 57 engageable with a shoulder 58 on a tubular member 59 provided with trunnions 60 to which the hand brake can be connected. It will be seen that by pulling trunnions 60 to the left, the shoulder 58 will be engaged with the end ring 57 to pull the piston 3 also to the left to cause operation identical to that as if air had been applied to the cylinder 2. Likewise, if the pull to the left on the trunnions 60 is released, the piston 3 will be returned to the right by the piston return spring 6 in exactly the same manner as in the normal air operation of the brake cylinder 1.

In the above-described embodiments of FIGS. 1 and 2, the slack adjuster 7 is incorporated with the cylinder 1 for disposition in a conventional brake rigging in a manner disclosed in aforementioned application Ser. No. 426,807. However, the present invention is equally applicable to slack adjusters which are mounted in a brake rigging independently of the brake cylinder, also as disclosed in the aforementioned application, reference now being made to present FIG. 3 illustrating such a double-acting slack adjuster.

Figure 3:
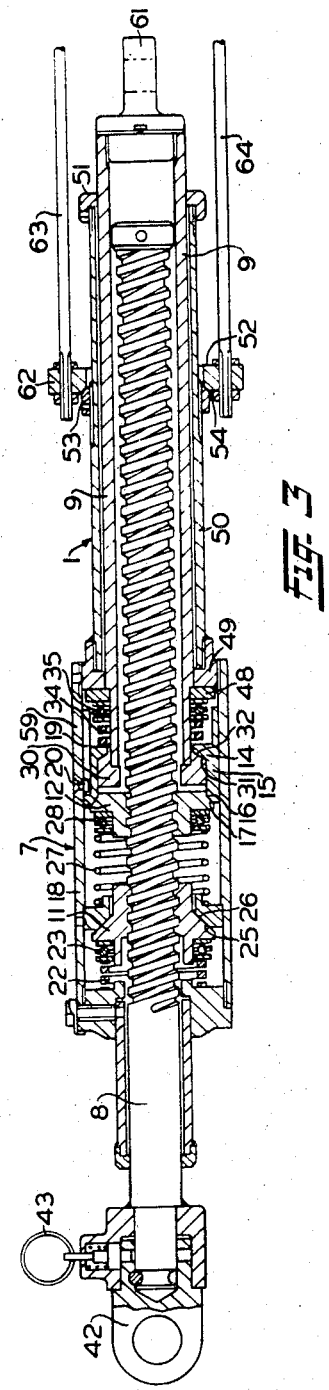
FIG. 3 is a cross-sectional view of the double-acting slack adjuster of the present invention adapted for mounting in a brake rigging.

In FIG. 3, there is shown a double-acting slack adjuster which constructionally is substantially identical to the slack adjuster of the combined brake cylinder and slack adjuster shown in FIG. 2. In view of the similarity between the slack adjuster of FIG. 3 and the slack adjuster 7 in FIG. 2, it is believed that there is no necessity for a detailed description of this slack adjuster except merely to observe the small differences which arise in the construction of the respective slack adjusters due to their different contexts, and to observe the manner in which the slack adjuster 7 of FIG. 3 is adapted for connection in a brake rigging. The crosshead 42 connected by the latch means (illustrated in cross section in FIG. 3) to the first member 8 is adapted for pivotal connection to a lever of the rigging (FIG. 7). At the other end of the slack adjuster 7, the second member 9 is provided with a crosshead 61 (instead of being connected to the piston 3, as in FIG. 2), and this crosshead 61 is adapted for connection by a pin (not shown) to another lever, not shown, of the brake rigging.

In the construction of FIG. 2, the extension 50 carries the stop-ring 51 and the further ring 53. These rings are engageable in operation of the slack adjuster with the faces 52 and 54, respectively, of the ring 46 which is secured to a part of the cylinder 2 by the pins 47. In the FIG. 3 construction, the slack adjuster 7 being removed from the brake cylinder 1, the ring 62 is located separately from the brake cylinder 1 and is mounted on a pair of rods 63, 64 pivotally carried by a fixed bracket, not shown. The operation of the slack adjuster shown in FIG. 3, is substantially identical to that of the slack adjuster shown in FIG. 2, and since the construction and operation thereof will be clear and apparent by reference to the description of FIG. 2, the same is omitted to avoid undue repetition.

Having now described the invention, what we claim as new and desire to secure by Letters Patent is:

1. An automatic slack adjustor comprising a first and second member movable telescopically relative one to the other to effect slack adjustment, the first member having a threaded portion threadably engaged by first and second nuts, displacement of which on the screw-threaded portion effects relative telescoping of the two members, a sensing member resiliently axially located with respect to the second member and nonrotatably mounted relative thereto for movement with the second member into engagement with a stop, a first spring resiliently holding the first nut in clutched engagement with the sensing member and a second spring extending between the sensing member and the second nut and resiliently holding the second nut in clutched engagement with the second member, the arrangement being such that a force applied to the first member in the brake-applying direction tends to break the clutched engagements against the resilient force exerted thereon by the springs and a force applied to the first member in the opposite direction tends to reinforce the clutching of the nuts to the sensing member and second member, respectively, and further means is provided to secure adjustment of slack in the slack increasing direction, said further means comprising an element normally held clutched to the second member by a third spring compressible only, upon the application thereto, of a force, the magnitude and direction of that which is transmitted, in operation of the slack adjuster, through the slack adjuster during actual braking, said element constituting the means by which the second nut is clutched to the second member and being rotatably supported relative to the second member when the element is declutched from the second member by compression of the third spring.

2. A slack adjuster, as claimed in claim 1, wherein the sensing member is non-rotatably coupled to the element.

3. A slack adjuster, as claimed in claim 2, wherein the sensing member is coupled to the element by a pin-and-slot arrangement.

4. A slack adjuster, as claimed in claim 1, wherein the element is rotatably supported by a thrust bearing which is located between the third spring and the element.

5. A slack adjuster, as claimed in claim 1, wherein the element is rotatably supported by a thrust bearing which is located between the third spring and the second member.

6. An automatic double-acting slack adjuster comprising: a first and second member telescopically relatively extensible and retractable one to the other to effect slack adjustment, support means carrying said second member for axial movement relative thereto, said first member having a threaded portion disposed axially thereon, nut means disposed on said threaded portion of said first member, means carried by said second member cooperating with said nut means to hold said first member in a predetermined telescoped position relative to said second member during movement of said second member relative to said support under a no-slack condition, said means carried by said second member including sensing means normally clutching said nut means relative to said second member and operable in response to movement of said second member under an excessive slack condition to de-clutch said nut means for effecting extension of said first member relative to said second member to eliminate said excessive slack condition, and, said means carried by said second member further including second means normally clutching said sensing means to said second member and operable in response to movement of said second member relative to said support under an inadequate slack condition to de-clutch said sensing member to provide movement of said nut means on said first member to retract said first member relative to said second member for eliminating said inadequate slack condition, said second means comprising a flange member coaxially disposed on said second member for axial and rotatable movement relative thereto, a first clutch means fixed on said second member, a second clutch means carried by said flange, spring means disposed between said flange and said second member normally urging said first and said second clutch means into engagement, said spring means being of such strength as to collapse to disengage said first and said second clutch means only under a condition of inadequate slack when said second member is extended relative to said support.

7. The double-acting slack adjuster, as recited in claim 6, in which, a thrust bearing is disposed between said second member and the end of said spring means opposite the end engaging said flange.

8. An automatic double-acting slack adjuster comprising: a first and second member telescopically relatively extensible and retractable one to the other to effect slack adjustment, support means carrying said second member for axial movement relative thereto, said first member having a threaded portion disposed axially thereon, nut means disposed on said threaded portion of said first member, means carried by said second member cooperating with said nut means to hold said first member in a predetermined telescoped position relative to said second member during movement of said second member relative to said support under a no-slack condition, said means carried by said second member including sensing means normally clutching said nut means relative to said second member and operable in response to movement of said second member under an excessive slack condition to de-clutch said nut means for effecting extension of said first member relative to said second member to eliminate said excessive slack condition, and, said means carried by said second member further including second means normally clutching said sensing means to said second member and operable in response to movement of said second member relative to said support under an inadequate slack condition to de-clutch said sensing member to provide movement of said nut means on said first member to retract said first member relative to said second member for eliminating said inadequate slack condition, said support means comprising a cylinder having a piston therein, and, said second member is attached to said piston for movement therewith.

9. The double-acting slack adjuster, as recited in claim 8, in which trunnion means are attached to said cylinder for pivotally mounting said cylinder in a brake rigging.

10. The double-acting slack adjuster, as recited in claim 8, in which said second member is attached to said piston for pivotal movement relative thereto.

References Cited
UNITED STATES PATENTS 2,225,001   12/1940   Browall _____ 188—196

DUANE A. REGER, *Primary Examiner.*